United States Patent
Marsh et al.

(10) Patent No.: US 7,444,362 B2
(45) Date of Patent: Oct. 28, 2008

(54) METHOD AND SYSTEM OF SENDING A REDUCED REPRESENTATION OF LOGGING DATA TO LOG ANALYSIS APPLICATIONS

(75) Inventors: Laban M. Marsh, Houston, TX (US);
Robert A. Schave, Conroe, TX (US);
Alp Kozak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 468 days.

(21) Appl. No.: 10/899,558

(22) Filed: Jul. 27, 2004

(65) Prior Publication Data
US 2006/0026149 A1    Feb. 2, 2006

(51) Int. Cl.
*G06F 17/30* (2006.01)

(52) U.S. Cl. .......................................... 707/202; 707/3

(58) Field of Classification Search .................... 707/1, 707/3–5, 200, 10
See application file for complete search history.

(56) References Cited

U.S. PATENT DOCUMENTS

| | | | | |
|---|---|---|---|---|
| 4,566,318 A * | 1/1986 | Rao et al. | ................. | 73/152.43 |
| 5,490,121 A * | 2/1996 | Gardner et al. | ................. | 367/83 |
| 6,229,453 B1 * | 5/2001 | Gardner et al. | ........... | 340/853.8 |
| 6,704,656 B1 * | 3/2004 | Abriol et al. | .................. | 702/6 |
| 6,751,555 B2 * | 6/2004 | Poedjono | ....................... | 702/6 |
| 6,760,665 B1 * | 7/2004 | Francis | ......................... | 702/6 |
| 6,816,787 B2 * | 11/2004 | Ramamoorthy et al. | ........ | 702/7 |
| 6,909,667 B2 * | 6/2005 | Shah et al. | ..................... | 367/83 |
| 2002/0184366 A1 * | 12/2002 | Kimoto et al. | ............. | 709/224 |
| 2004/0064258 A1 * | 4/2004 | Ireland | .......................... | 702/9 |

* cited by examiner

*Primary Examiner*—Cheryl Lewis
(74) *Attorney, Agent, or Firm*—Mark E. Scott; Utpal D. Shah; Conley Rose, P.C.

(57) ABSTRACT

A method and system of reducing logging data for log analysis applications. Some embodiments may be a method comprising sending a request for logging data from a log analysis application to a repository of logging data gathered by a logging device, and sending a reply comprising a reduced representation of at least some of the logging data.

55 Claims, 8 Drawing Sheets

US 7,444,362 B2

METHOD AND SYSTEM OF SENDING A REDUCED REPRESENTATION OF LOGGING DATA TO LOG ANALYSIS APPLICATIONS

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

Embodiments of the invention are directed to sending a reduced representation of logging data from a repository to a log analysis application.

2. Background of the Invention

Modern petroleum drilling and production operations demand a great quantity of information relating to parameters and conditions downhole. Such information may comprise characteristics of the earth formations traversed by the borehole, along with data relating to the size and configuration of the borehole itself. The collection of information relating to conditions downhole, which may be referred to as "logging," can be performed by several methods.

FIG. 1 illustrates a wireline logging system 100. The system 100 comprises a logging device 102 disposed in a borehole 104 that contains drilling fluid 106. The borehole 104 penetrates a formation 108, which may comprise several distinct layers of the underlying formation. The logging device 102 is connected by a wireline cable 110 to a well-logging truck 112 located at the surface. The wireline cable 110 provides power to the logging device 102 and is used to transmit signals from the logging device 102 to the well-logging truck 112. The well-logging truck 112 contains a collection system 114 that receives the signals, converts the signals into logging data, and stores the logging data in storage 116. After being stored in the storage 116, the logging data may be sent to a repository.

An alternative method of logging is the collection of data during the drilling process. Collecting data during the drilling process eliminates the necessity of removing the drilling assembly to insert a wireline logging device. Designs for measuring conditions downhole, including the movement and location of the drilling assembly contemporaneously with the drilling of the well, have come to be known as "measurement-while-drilling" techniques, or "MWD". Similar techniques, concentrating more on the measurement of formation properties, have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation properties and the collection of information relating to the movement and position of the drilling assembly.

In both LWD and wireline logging, the logging data obtained from a logging device may be transferred to the surface and eventually finds its way to a data repository, such as a database. The repository stores the logging data and handles requests for accessing the logging data by applications or programs designed to aid in interpreting the log data, some of which may be web-based. Geologists may use the programs to view the measurements obtained from the logging device.

The repository may store each datum of the logging data as a pair of floating point numbers. For each datum, a first floating point number may represent the value of the formation (e.g., resistivity or conductivity) and/or borehole characteristic measured, and a second floating point number may represent the associated depth. Thus, when requesting logging data from the repository, two floating point numbers may be sent for each datum. The time required to transfer logging data from the repository, especially over serial communication channels such as a standard 28.8 Kbps (kilo-bit per second) modem, may take from several minutes to several hours.

Thus, efficient mechanisms for transferring measurements from a data repository are desirable.

SUMMARY

The problems noted above are solved in large part by a method and system of sending a reduced representation of logging data to a log analysis application. Some embodiments may be a method comprising sending a request for logging data from a log analysis application to a repository of logging data gathered by a logging device, and sending a reply comprising a reduced representation of at least some of the logging data.

BRIEF DESCRIPTION OF THE DRAWINGS

In the following detailed description, reference will be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". The term "couple" or "couples" is intended to mean either an indirect or direct connection. Thus, if a first device couples to a second device, that connection may be through a direct connection or through an indirect connection via other devices and connections.

The term "plotting" refers herein not only to the printing of a plot with a printing or plotting device, but also to the displaying of a plot on a display device (e.g., a video display). In addition, the term "logging data" refers to data associated with measurements gathered by a logging device, independent of whether the data has its associated depth or time value.

DETAILED DESCRIPTION

The following discussion is directed to various embodiments of the invention. Although one or more of these embodiments may be preferred, the embodiments disclosed should not be interpreted, or otherwise used, as limiting the scope of the disclosure unless otherwise specified. In addition, one skilled in the art will understand that the following description has broad application, and the discussion of any embodiment is meant only to be illustrative of that embodiment and not intended to suggest that the scope of the disclosure is limited to that embodiment.

Figure 1:
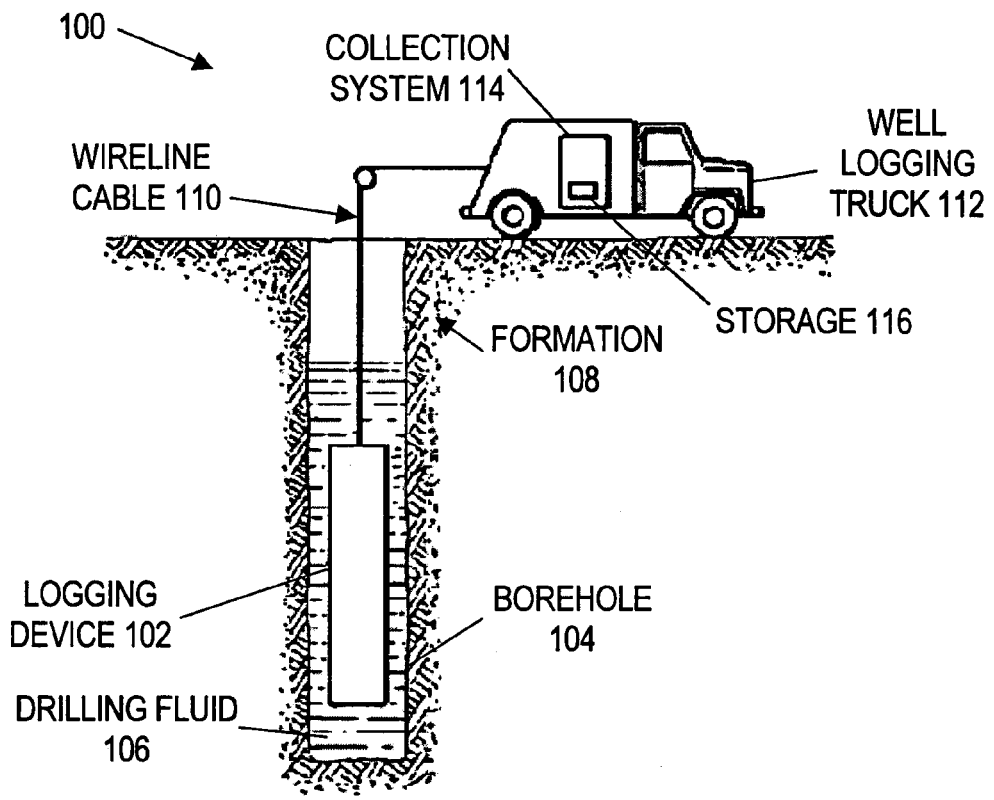
FIG. 1 illustrates an exemplary wireline logging system.
Figure 2A:
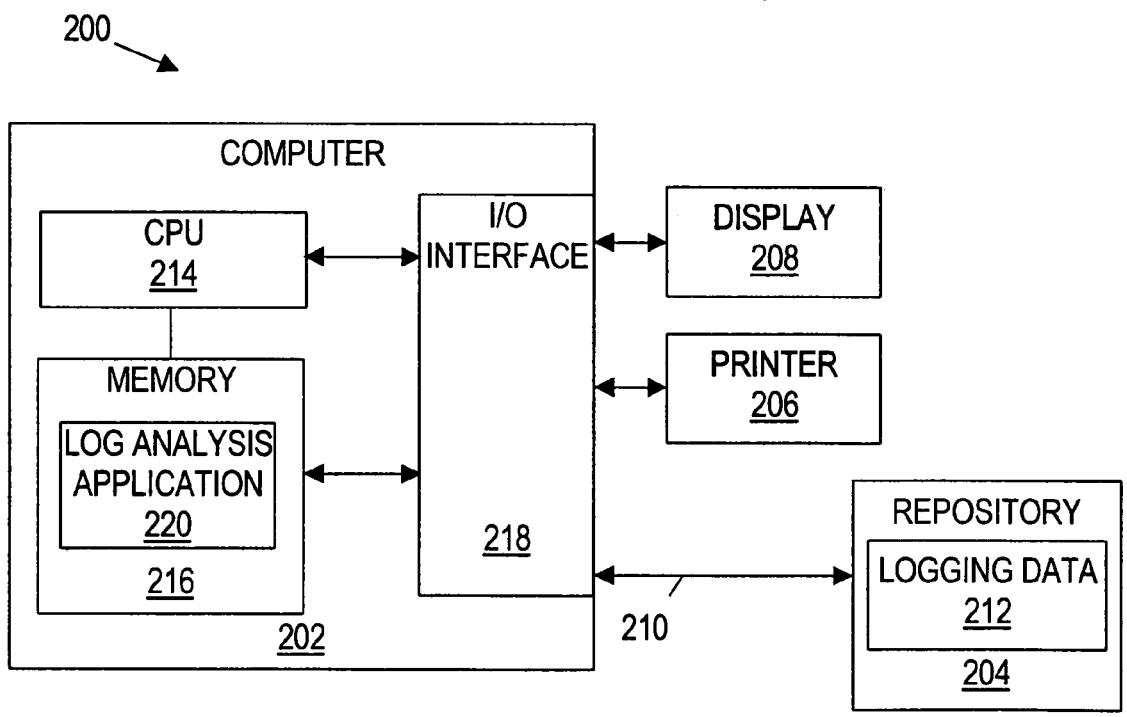
FIG. 2A illustrates a system for plotting logging data in accordance with embodiments of the invention.

FIG. 2A illustrates a system 200 to plot logging data, possibly gathered by a logging device, in accordance with embodiments of the invention. The system 200 comprises a computer 202 coupled a repository 204 through a communication link 210, the repository 204 containing logging data 212. The repository 204 may comprise a database, a data warehouse, an online analytical processing (OLAP) data store, or any other device capable of storing the logging data 212. The logging data 212 is preferably stored in the repository 204 as floating point numbers, either in accordance with the single-precision floating point representation of 32 bits (24 bits used for expressing the mantissa value and 8 bits used for exponent) or the double-precision floating point representation of 64 bits (53 bits used for expressing the mantissa value and 11 bits used for exponent). Other data types may be equivalently used. Each data point in the repository preferably comprises a pair of floating point numbers, one number representing the measurement value and one number indicative of depth. Thus, the depth may be represented directly, or in alternative embodiments a time value of when the measurement was taken may be stored with the measurement value (where the time value may be correlated to depth). References to depth values (e.g., start depth, end depth) in the specification thus encompass not only depth directly, but also any number indicative of depth, such as time that correlates to depth.

The computer 202 may comprise a central processing unit (CPU) 214 coupled to a memory 216 and an input/output (I/O) interface 218. The memory 216 may comprise any type of volatile or non-volatile memory, such as random access memory (RAM), read only memory (ROM), and/or a hard drive. Stored within the memory 216 is a log analysis application 220. The log analysis application 220 may generate plots of the logging data 212 and/or otherwise allow a user to analyze the logging data. Once generated by the log analysis application 220, a plot may be displayed on the display 208 coupled to the computer 202, and/or printed by the printer 206 coupled to the computer 202.

Although not specifically shown, a user may interface with the log analysis application 220 through devices such as a keyboard and/or pointing device. The user may utilize these I/O devices to specify a plot desired to be generated by the log analysis application 220.

Figure 2B:
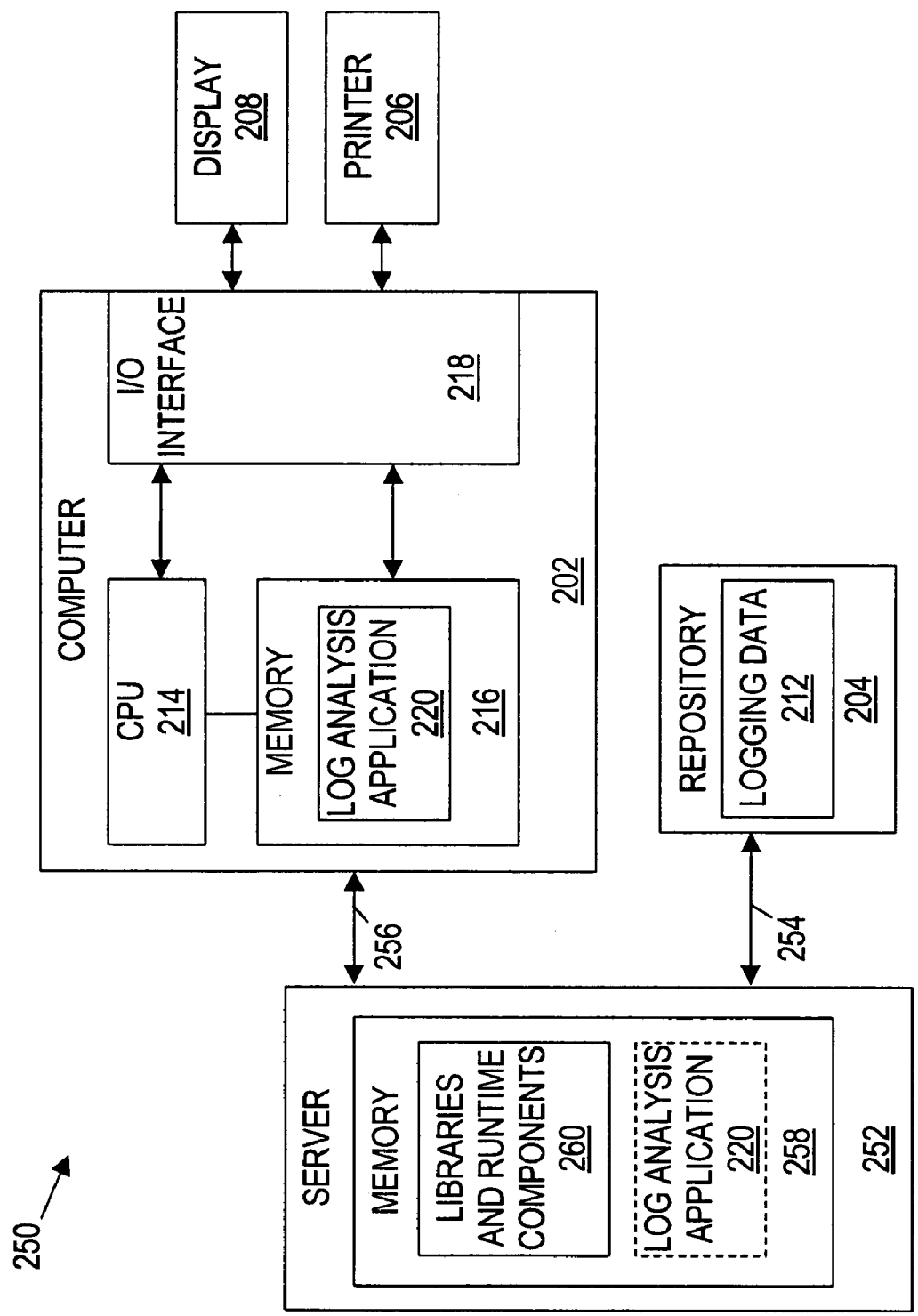
FIG. 2B illustrates a system for plotting logging data in accordance with alternative embodiments of the invention.

FIG. 2B illustrates a system 250 to plot logging data, possibly gathered by a logging device, in accordance with alternative embodiments of the invention. The system 250 comprises a server 252 coupled the repository 204 and the computer 202 through communication links 254 and 256, respectively. The server 252 comprises a memory 258 that contains software libraries and other runtime components 260, and the server 252 comprises a web-server and/or an application server. In some embodiments the memory 258 may also hold a copy of the log analysis application 220, and transfer the log analysis application to computer 202 for execution. For example, the memory 258 may contain a Java® applet version of the log analysis application 220 that is transferred to the computer 202 on demand.

In alternative embodiments, the log analysis application 220 may execute on the server 252 after being invoked, possibly by way of a web-browser or web-based interface, such as ".NET". In these embodiments, the web-browser may run on computer 202, and may communicate with the log analysis application 220 running on the server 252 though one or more application threads.

Figure 3:
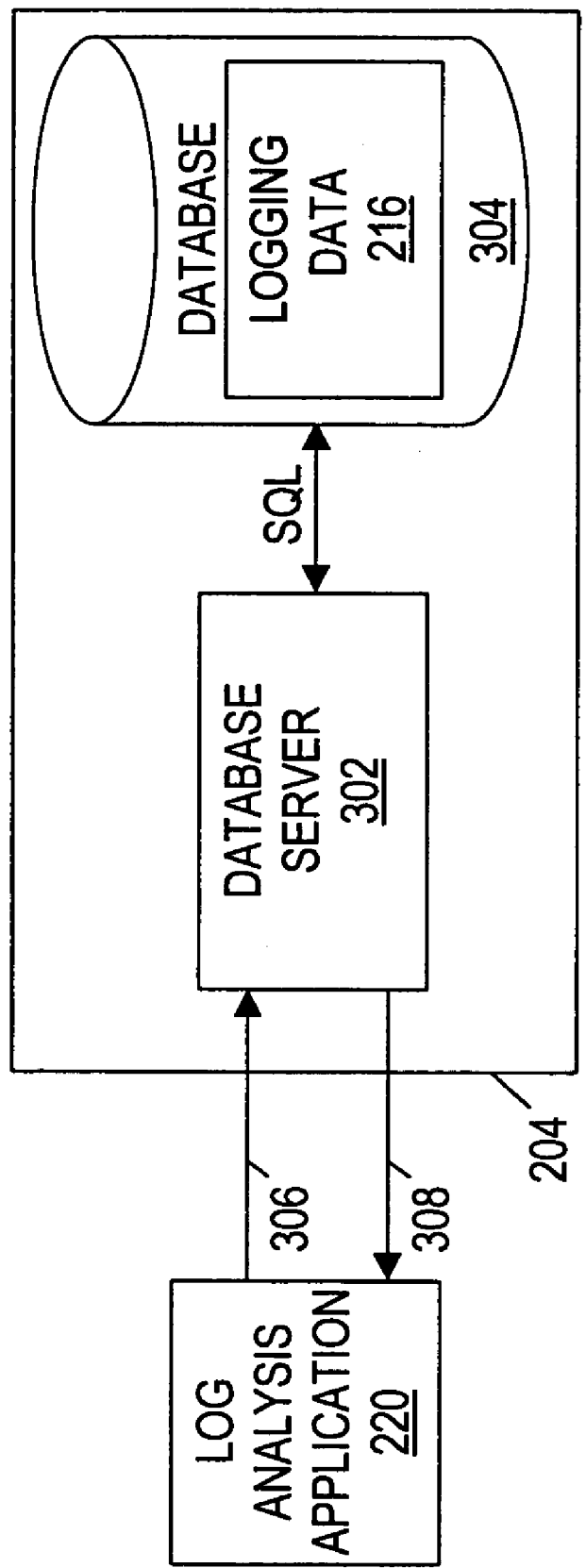
FIG. 3 illustrates an exemplary implementation of the repository of FIG. 2.

FIG. 3 illustrates the relationship between the log analysis application 220 and the repository 204 in accordance with embodiments of the invention. The repository 204 comprises a database server 302 coupled to a database 304. The database server 302 may communicate with the database 304 by any suitable method, such as structured query language (SQL). The log analysis application 220, regardless of it execution location, may send requests 306 for a portion or all the logging data 216 to the database server 302. The database server 302 may respond with a reply 308 that contains the requested logging data 216. The request 306 and the reply 308 may be exchanged between the database server 302 and the log analysis application 220 via a transport protocol, such transmission control protocol (TCP) or internetwork packet exchange (IPX).

Figure 4:
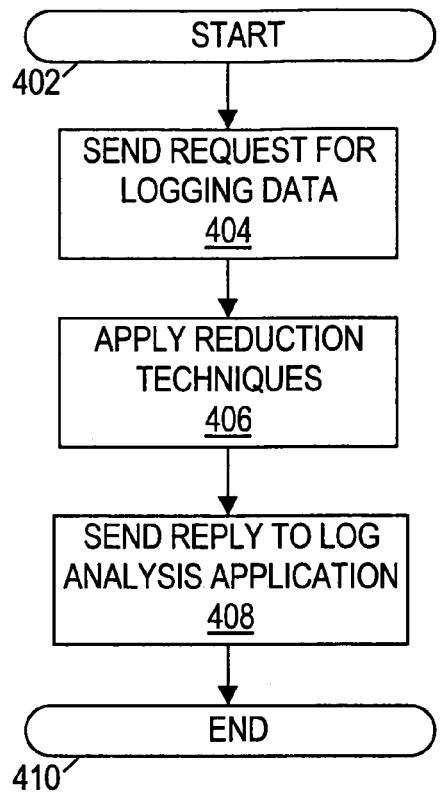
FIG. 4 illustrates a method in accordance with embodiments of the invention.

FIG. 4 illustrates a high level flow diagram of requesting and providing logging data in accordance with embodiments of the invention. The procedure may start (block 402), and thereafter the log analysis application 220 sends a request for logging data to the repository 204 (block 404). The database server 302 may retrieve the requested logging and apply one or more reduction techniques on the logging data (block 406). The database server 302 may then send a reply to the log analysis application 220 containing a reduced representation of the requested logging data (block 408), and the procedure may end (block 410). Using a reduced representation of the logging data reduces the amount of time and/or bandwidth needed to transfer the requested information to the computer 202 over communication links such as link 210 of FIG. 2A or links 254 and 256 of FIG. 2B. The following discussion relates to various reduction techniques that may be employed by the database server 302 on the logging data.

Figure 5:
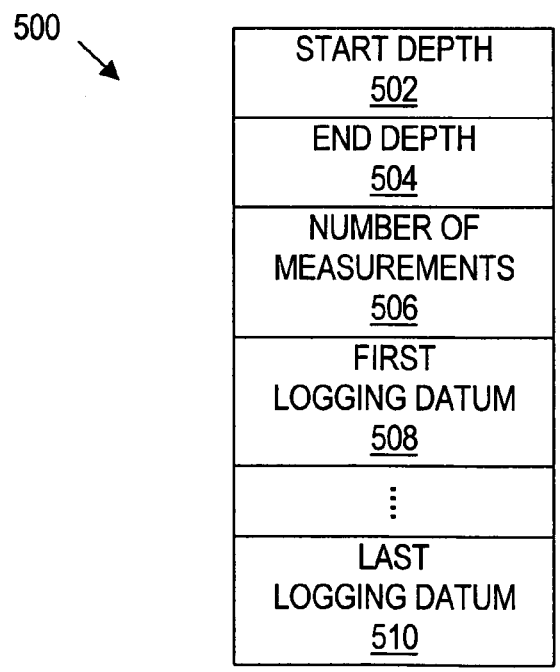
FIG. 5 illustrates the layout of a reply used to transfer logging data in accordance with various embodiments of the invention.

One reduction technique involves sending the requested logging data without the associated depth values. In particular, a reply to a request for logging data may comprise only a start depth and an end depth value. The logging data is assumed to be equally spaced between the start depth and end depth for plotting purposes. FIG. 5 illustrates a layout 500 of a reply 308 (FIG. 3) in accordance with these embodiments of the invention. The layout 500 comprises the following fields: a start depth 502, an end depth 504, a number of measurements 506, and a first logging datum 508 through a last logging datum 510. For example, each of the fields 502-510 may hold up to four bytes, the size of a single-precision floating-point number. Depending upon the number of measurements contained in layout 500, the total size may vary from 16 bytes (for a reply containing a single logging datum) to 4n+12 bytes, for a reply containing n measurements.

The start depth field 502 may store a value indicative of the vertical depth associated with the logging datum in the first logging data field 508. The end depth field 504 may store a value indicative of the vertical depth associated with the logging data in the last logging datum field 510. The number of measurements field 506 may store a total number of data points in the layout 500. For example, a value of "50" may indicate that the reply contains fifty data points, which are stored in the first measurement field 508 through the last measurement field 510. In alternative embodiments using time based logging data, the start depth field 502 and end depth field 504 may respectively contain start time and end time for the logging data.

The log analysis application 220 may utilize the information contained in the layout 500 to generate a plot. When receiving logging data in accordance with the layout 500, the log analysis application 220 may plot the data points as equally spaced points (i.e., each logging datum representing equidistant depths). Thus, for determining the depth associated with each logging datum only the start and end depths stored in the start depth field 502 and the end depth field 504 respectively, and the number of measurements stored in the number of measurement field 506, are needed by the log analysis application 220 to generate the plot. The log analysis application 220 may calculate the spacing between the data points using the following relation:

$$\text{Spacing}=[\text{abs}(D_{END}-D_{START})]/(N_M-1) \quad (1)$$

where $D_{END}$ is the value stored in the end depth 504 field; $D_{START}$ is the value stored in the start depth 502 field; $N_M$ is the value stored in the number of measurements 506 field; and abs( ) represents the absolute value function. Using the spacing and one of the start depth or end depth, the depth associated with each measurement may be calculated.

Variations in the layout 500 may also be used. For example, a spacing field may be included, eliminating the need for either the start depth field 502 or the end depth field 504. Regardless of the mechanism by which spacing and depth information is conveyed, using layout 500 results in not having to transmit a floating point value indicative of depth with every logging datum and thus a reduction in size of the reply 308 by approximately a factor of two over a standard reply that contains a pair of floating point numbers for each logging datum. In alternative embodiments the layout 500 may use an end token value. Thus, instead of a number of measurements field, the occurrence of a particular unique value in the compressed sequence may indicate the end of the sequence.

In the foregoing discussion, reduction of the floating point logging data is made by sending at least some of the floating point logging data without corresponding values indicative of depth. In some cases the resolution of the floating point logging data may be reduced without a noticeable effect on a plot generated by the log analysis application. For example, the resolution of the display 208 (FIG. 2) or the resolution of a plot printed by the printer 206 may not require floating point precision. Thus, in addition to (or in place of) the reduction technique of sending some logging data without associated values indicative of depth, some embodiments reduce the size of the logging data sent in the layout 500 by mapping the logging data to lower resolution.

In accordance with at least some embodiments, the request 306 (FIG. 3) may include characteristics of the plot, such as a left plot limit, a right plot limit, and attributes of the plotting parameters (i.e., linear or logarithmic). The database server 302 may map the requested floating point logging data to a lower resolution, based on the characteristics, before transmitting the reply 308. In these embodiments, the first measurement field 508 through last measurement field 510 (FIG. 5) may contain the lower resolution data, thereby reducing the size of the layout 500. The following pseudo code illustrates a mapping from floating point to exemplary 16 bit unsigned integers:

$$x=[(M_V-L_L)*65535]/(R_L-L_L)$$

IF x<0, THEN x=0

IF x>65535, THEN x=65535

INTEGER=INT(x)

where $M_V$ represents the logging datum to be mapped; $L_L$ represents the left-side plot limit; $R_L$ represents the right-side plot limit; the function INT converts a floating point to the nearest integer, rounding when appropriate; and INTEGER represents the resulting 16-bit mapped integer. Similarly, for a logarithmic plot, the database server 302 may map the requested floating point into lower resolution numbers, such as 16-bit unsigned numbers, using the following pseudo code:

$$x=[LOG(M_V)-LOG(L_L)*65535]/[(LOG(R_L)-LOG(L_L)]$$

IF x<0, THEN x=0

IF x>65535, THEN x=65535

INTEGER=INT(x)

where $M_V$ represents the logging datum to be mapped; $L_L$ represents the left-side plot limit; $R_L$ represents the right-side plot limit; the function INT converts a floating point to the nearest integer, rounding when appropriate; LOG represents the log base 10 function; and INTEGER represents the resulting 16-bit mapped integer.

In some cases it may be desirable to plot logging data beyond the plot limits (e.g., plotting beyond the pre-printed grid on plot paper). In these cases, the database server 302 may map the requested floating point logging data into lower resolution, such as 16-bit unsigned numbers, using the following pseudo code:

$$x=[(M_V-L_L)*21844]/(R_L-L_L)+21845;$$

IF x<0, THEN x=0;

IF x>65535, THEN x=65535;

INTEGER=INT(x);

Similarly, for a logarithmic plot with the ability to plot beyond the plot limits, the database server 302 may map the requested floating point logging data into lower resolution, using the following pseudo code:

$$x=[LOG(M_V)-LOG(L_L)*21844]/[(LOG(R_L)-LOG(L_L)]+21845;$$

IF x<0, THEN x=0;

IF x>65535, THEN x=65535;

INTEGER=INT(x);

where $M_V$ represents the logging data to be mapped; $L_L$ represents the left-side plot limit; $R_L$ represents the right-side plot limit; the function INT converts a floating point datum to the nearest integer, rounding when appropriate; and LOG represents the log base 10 function; and INTEGER represents the resulting mapped logging datum.

In embodiments that permit plotting beyond the plot limits, equal spans of integers may represent sections of the plot. For example, one-third of the numbers capable of being represented by a 16-bit integer may be utilized for wraps on the left side (i.e., 0 to 21844), one-third for wraps on the right side (i.e., 43690 to 65535), and one-third for the unwrapped data (i.e., 21845 to 43689). By mapping the logging data in the foregoing fashion, the size of the layout 500 may be reduced by approximately a factor of four over a standard reply containing a pair of floating point numbers for each logging datum.

Figure 6:
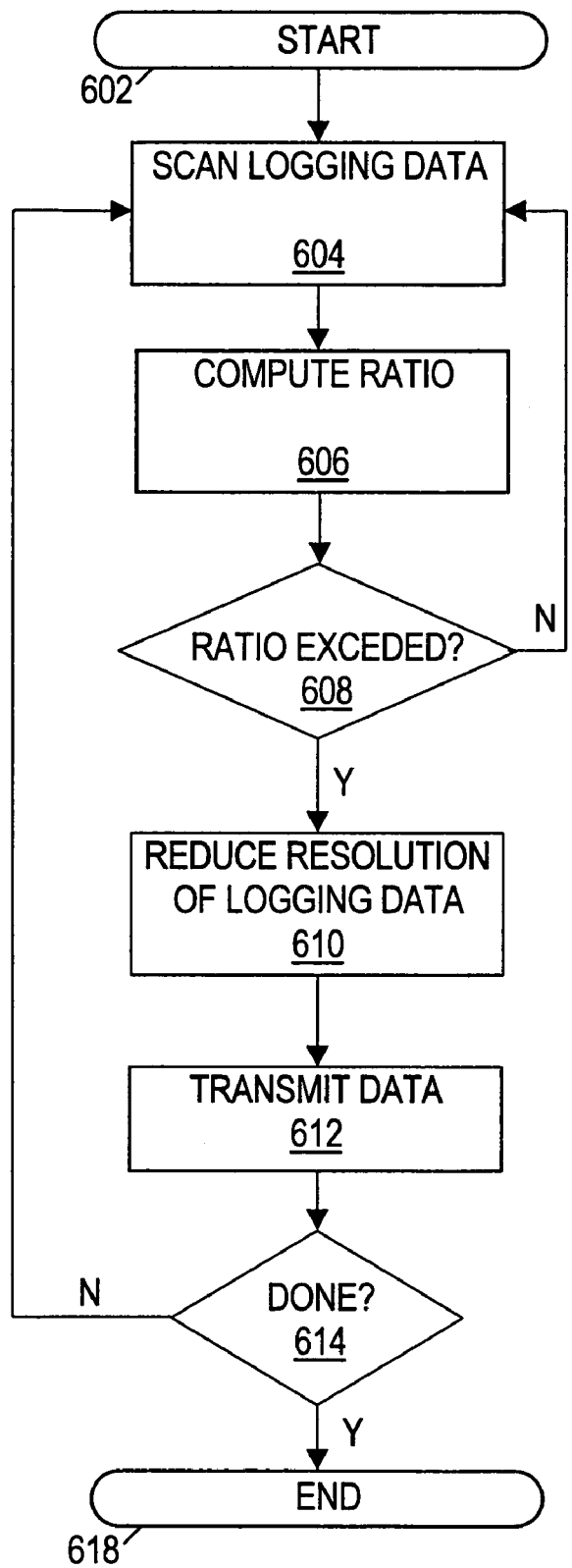
FIG. 6 illustrates a method of mapping segmenting in accordance with embodiments of the invention.

In some embodiments, mapping of the floating point logging data to lower resolution (with or without the reduction technique of refraining from sending at least some values indicative of depth) may be performed on segments of floating point logging data. The segments may be chosen to optimize the compression or mapping to lower resolution, and segmenting may take many forms. In some embodiments, any one logging datum's membership in a segment may be based on the ratio of the largest logging datum to smallest logging datum of the segment. FIG. 6 illustrates a method of segmenting based on ratio, and then mapping to lower resolution. The procedure may start (block 602), and proceed to the database server 302 scanning a segment of the requested logging data (block 604). While scanning, the ratio of the maximum scanned logging datum to the minimum scanned logging datum is computed (block 606). If the ratio does not exceed a predetermined threshold value (block 608), the second logging datum becomes part of the segment and the scanning continues (block 604). If a logging datum causes the ratio to be exceeded, or all of the requested logging data values has been scanned, the logging data within the segment are mapped to a lower resolution data format (block 610) and transmitted to the log analysis application 220 (block 612). If all the requested logging data has not been associated with a segment and transmitted to the log analysis application 220, the scanning and ratio computation continues (block 614). When all of the requested logging data are received by the log analysis application 220 (block 614), the procedure may end (block 618).

Figure 7:
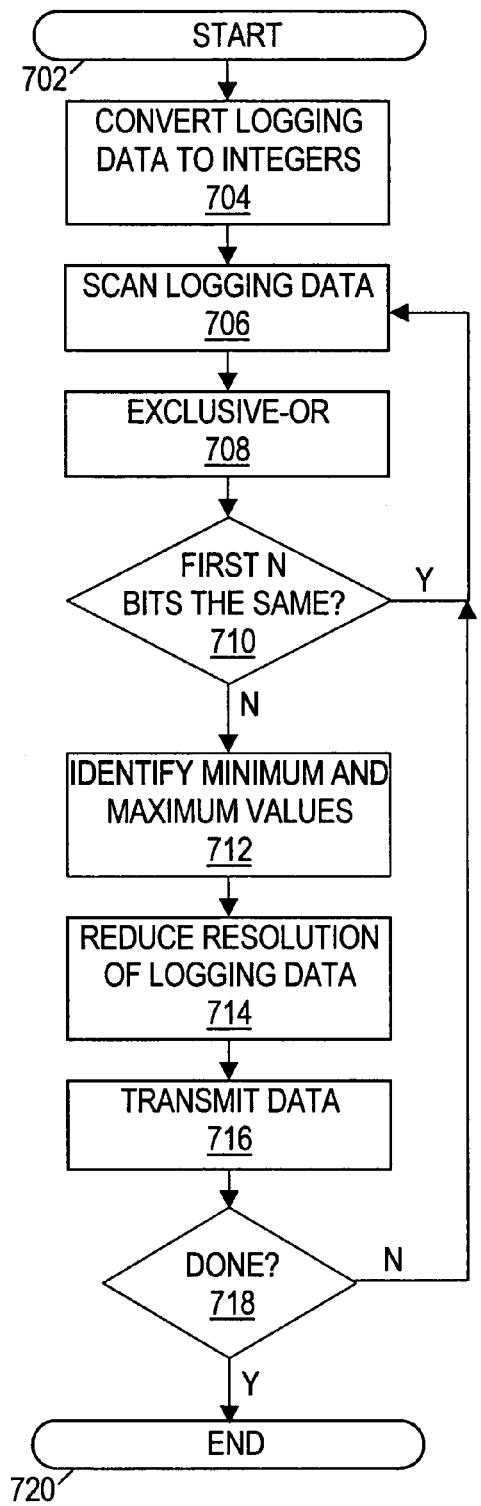
FIG. 7 illustrates an alternative method of segmenting in accordance with embodiments of the invention.

As an alternative to segmenting based on a ratio of a maximum logging datum to minimum logging datum value, some embodiments may segment the data based on comparing a plurality of most significant bits of the logging data. FIG. 7 illustrates a method of segmenting in accordance with alternative embodiments, and then mapping to a lower resolution. The procedure may start (block 702) and proceed to converting the identified logging data into integers (block 704). Because at this stage maintaining as great a resolution of the logging data as possible is desired, the converting of the logging data may be from floating point numbers to 24 or 32-bit integers. As will be discussed more fully with respect to block 706 and 708, the conversion to integers is to allow for the exclusive-or operations, and in alternative embodiments where the program allows exclusive-or operations on floating point numbers, this conversion step may be omitted. The next step in the process may be the server 302 scanning a segment of the requested logging data (block 706). While scanning, the database server 302 performs exclusive-or (XOR) operations (block 908). If the exclusive-or operation indicates that the first N number of bits of two logging data values are the same, (block 710), the second logging datum becomes a part of the segment and the scanning continues (block 706). If the first N number of bits of a logging datum are not the same as the other logging data in the segment, that particular segment may be considered closed and the next step may be identifying the minimum and maximum values within the segment (block 712). After the minimum and maximum values are identified, the resolution of the logging data is reduced (block 714). In accordance with at least some embodiments of the invention, the resolution of the logging data within the segment may be reduced to an integer having less than 32 bits, and preferably a 16-bit integer. Thereafter, the data is transmitted (block 716) and if all the segments have been reduced and sent (block 718), the process ends (block 720). If, on the other hand, the logging data remains to be segmented and reduced (block 718), the process returns to scanning the logging data for purposes of identifying a segment (block 706).

In the embodiments discussed to this point a reduced representation of the logging data is made by refraining from sending corresponding depth information and/or mapping the logging data to lower resolution. In accordance with some embodiments, the log analysis application 220 may restore the logging data from the lower resolution to a higher resolution, thereby increasing the resolution of the logging data yet still reducing bandwidth requirements between the log analysis application and the repository.

Figure 8:
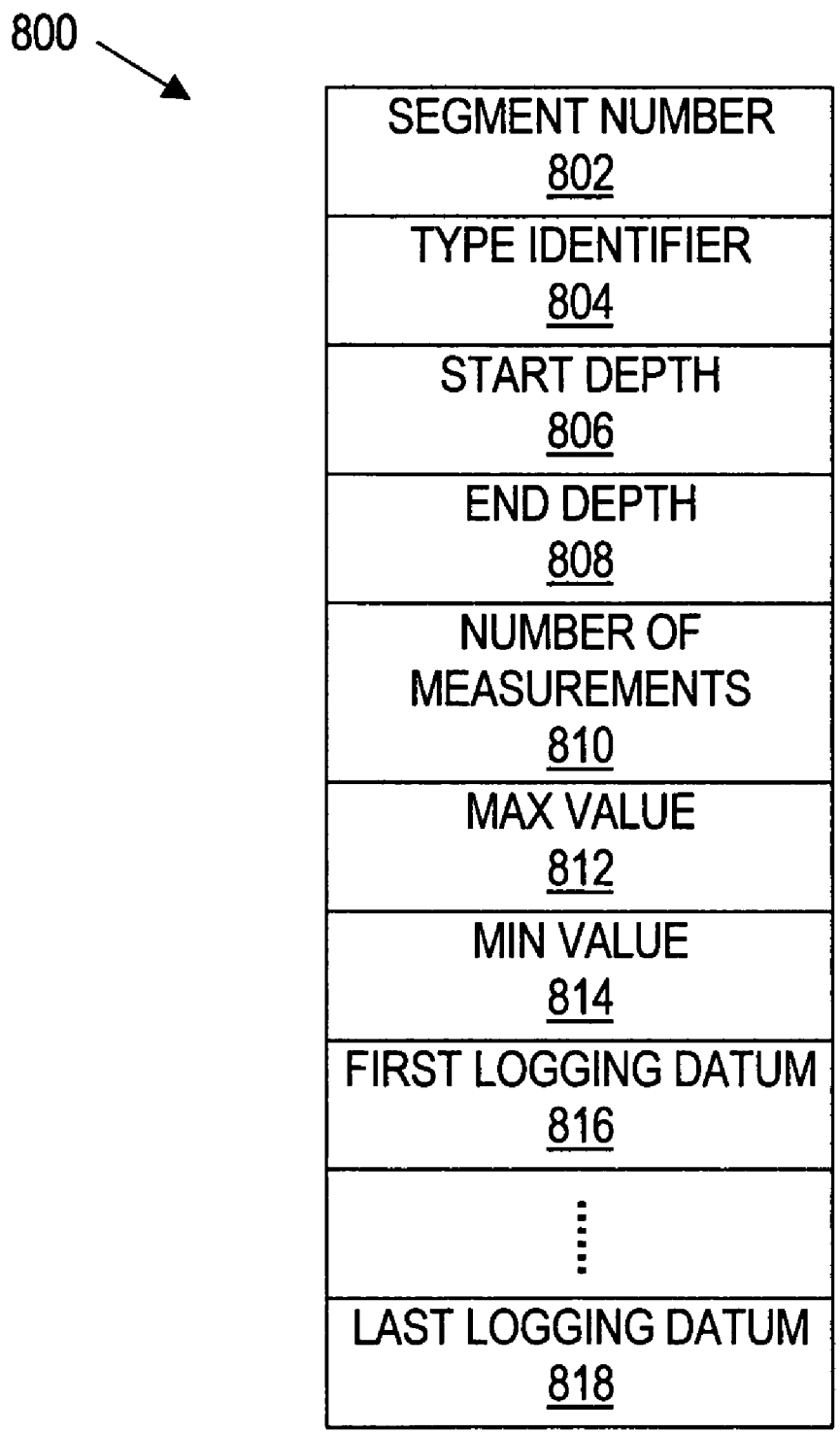
FIG. 8 illustrates a layout of a reply in accordance with alternative embodiments of the invention.

FIG. 8 illustrates a layout 800 for use in accordance with embodiments of the invention where the resolution of the logging data may be at least partially restored. The layout 800 comprises the following fields: a segment number 802, a type identifier 804, a start depth 806, an end depth 808, a number of measurements 810, a maximum value 812, a minimum value 814, and a first logging datum 816 through a last logging datum 818. The segment number 802 field may contain a numeric identifier of the segment. The type identifier 804 field may contain an identifier of the type of compression utilized for the respective segment, e.g., an indication the values represented were originally floating point and were mapped to 16-bit integers. The value of the vertical depth associated with the first logging datum 816 is stored in the start depth field 806. A value of the vertical depth associated with the last logging datum 818 is stored in the end depth field 808. The number of measurements field 810 contains a number of the logging data points contained in the segment. The maximum valued logging datum of the segment is stored in the maximum value field 812, and the minimum valued logging datum is stored in the minimum value field 812. The requested logging data associated with the respective segment is stored in the first logging datum field 816 through the last logging datum field 818 in reduced format. Additional fields may be included as desired.

The database server 302 preferably maps the requested floating-point logging data to a lower resolution data format (block 610 of FIG. 6, block 714 of FIG. 7), such as 16-bit unsigned numbers, using the following relation:

$$\text{INTEGER} = \text{INT}((M_V - M_{MIN})*65535/(M_{max}31\, M_{MIN}); \quad (2)$$

where $M_V$ represents the logging datum to be mapped; $M_{MIN}$ represents the minimum logging datum value stored in minimum value field 814; the function INT converts a floating point number to the nearest integer, rounding when appropriate; and INTEGER represents the resulting mapped logging datum. By mapping in this fashion, the entire resolution provided by the lower resolution data format (e.g., a 16-bit unsigned number) is utilized to convey the logging datum.

Once received by the log analysis application 220, the mapped values may be restored to a higher resolution (block 726), such as floating-point integers, using the following relation:

$$\text{RESTORED\_VALUE} = (\text{FLOAT}(\text{INTEGER})*(M_{MAX} - M_{MIN})/65535) + M_{MIN} \quad (3)$$

where INTEGER represents the mapped logging datum to be restored; $M_{MIN}$ represents the minimum logging datum value stored in the minimum value field 814; $M_{MAX}$ represents the maximum logging datum stored in the maximum value field 812; and the function FLOAT converts an integer into a floating point representation. Depending upon the value of the ratio chosen as a cut-off for segment formation, the logging data may be compressed by a factor of four, while losing only a small percentage of precision during restoration. For example, a ratio of 131 as the cut-off for segment formation may result in a maximum error between the actual measurement values and the restored measurement values of 0.000757% to 0.09995%.

In addition to or in place of the techniques that create the reduced representation of the logging data, at least some embodiments use a "Delta" compression system to reduce the requested logging data. Delta compression utilizes the change between each consecutive logging datum to encode the values. Consider, for example, a set of logging data for a particular parameter where the formation characteristic or borehole characteristic does not change or changes only slightly logging datum to logging datum. In embodiments where Delta compression is used, a first logging datum of a reply may be in unreduced form (e.g., floating point integer). For a number of consecutive logging data thereafter, in the reply only a change of the logging datum under consideration in relation to the value of the logging datum that was sent in uncompressed form is encoded into the reply. This change in value, or Delta value, may require fewer bits; therefore, the overall number of bits to transfer the logging data is reduced. An example using real numbers may be helpful in understanding the Delta compression concept.

Consider for purposes of explanation only, the following sequence of logging data: 5031, 5037, 5038, 5045, and 5087. In one embodiment, the first logging datum encoded in the reply (i.e., 5031) may be in its uncompressed format. For some number of logging data points thereafter, only the changes in value from the uncompressed logging datum may be sent. In this example, the values transmitted may be: 5031, +6, +7, +14, and +56.

In more mathematical terms, Delta values may relate back to the previous uncompressed value according to the following equation:

$$\Delta A[n]=A[n]-A[m] \qquad (4)$$

where A is the logging datum of interest, $\Delta A$ is the change in value of logging datum A, n is the index to the current datum, and m is the index to the last uncompressed datum of the reply.

In the previous embodiments the Delta values encoded are a change in relation to the uncompressed value. However, in alternative embodiments the Delta value encoded in the reply may in relation to the immediately previous value, regardless of whether that value is compressed or uncompressed. Consider for purposes of explanation the same sequence of logging data: 5031, 5037, 5038, 5045 and 5087. In these alternative embodiments, the number sequence encoded in the reply may be: 5031, +6, +1, +7 and +42. In more mathematical terms, the Delta values in this alternative embodiment may relate back to the immediately previous value (uncompressed or not) according to the following equation:

$$\Delta A[n]=A[n]-A[n-1] \qquad (5)$$

Co-pending application Ser. No. 10/619,197, U.S. Pat. No. 7,068,182, entitled "Method and Apparatus for Mud Pulse Telemetry," incorporated herein by reference, describes methods and systems for using Delta values to reduce the size of data transmissions.

Figure 9:
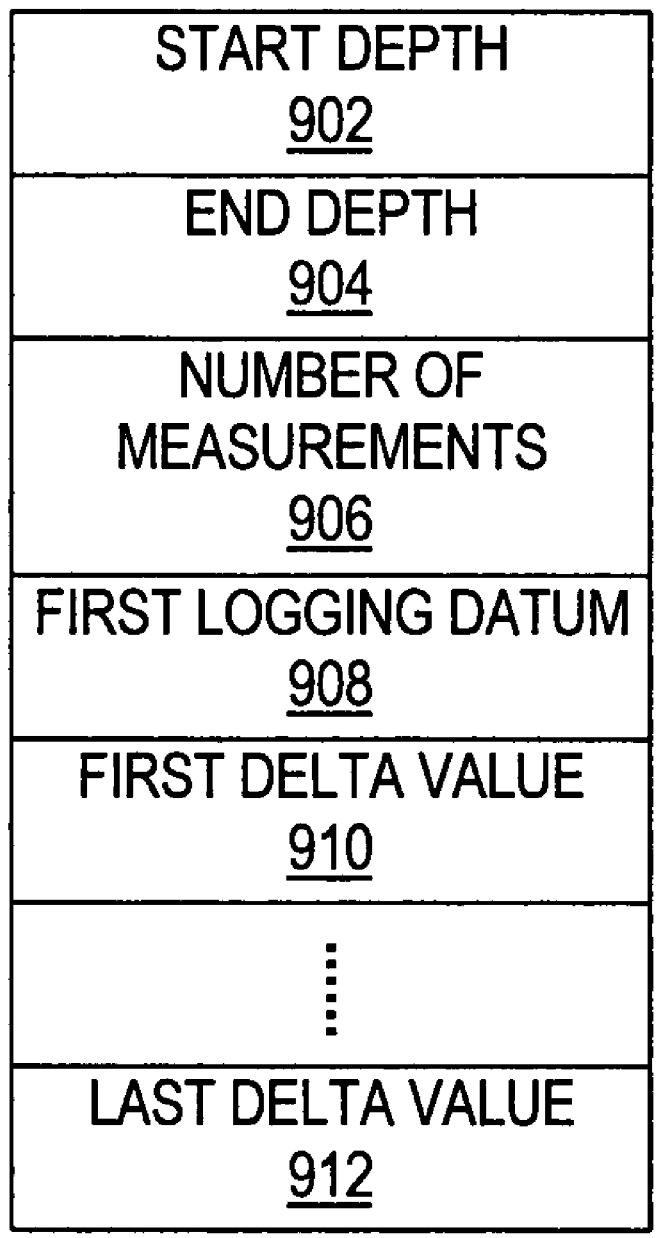
FIG. 9 illustrate the layout of a reply used to transfer Delta compressed logging data in accordance with embodiments of the invention.

FIG. 9 illustrates a layout 900 that may be used in conjunction with Delta compression to a reduced representation of data. The layout 900 comprises the following fields: a start depth 902, an end depth 904, a number of measurements 906, a first logging datum 908, a first Delta value 910 through a last Delta value 912. The first logging datum 908 may be uncompressed. The first Delta value 910 through the last Delta value 912 contain Delta values of subsequent logging data of the requested logging data. As can be appreciated, fields may be re-order, added, or deleted without affecting functionality. Delta compression may result in a compression factor of approximately eight over a standard reply that sends a pair of floating point integers for each measurement.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer implemented method comprising:
   sending a request for logging data from an application to a repository of logging data; and
   sending a reply in response to the request, wherein the reply comprises a reduced representation of at least some of the logging data.

2. The computer implemented method of claim 1 wherein sending the reply further comprises sending at least some of the logging data without corresponding values indicative of depth.

3. The computer implemented method of claim 2 further comprising sending at least some of the logging data without corresponding depth values.

4. The computer implemented method of claim 3 further comprising sending a start depth of the requested logging data and an end depth of the requested logging data.

5. The computer implemented method as defined in claim 2 further comprising sending at least some of the logging data without corresponding time values.

6. The computer implemented method of claim 5 further comprising sending a start time of the requested logging data and an end time of the requested logging data.

7. The computer implemented method of claim 1 further comprising, prior to sending the reply, mapping the logging data to a lower resolution.

8. The computer implemented method of claim 7 wherein mapping the logging data further comprises mapping the logging data from a floating point number to an integer number.

9. The computer implemented method of claim 7 further comprising:
   wherein sending the request further comprises sending a characteristic of a desired plot of the logging data; and
   wherein mapping the logging data further comprises lowering the resolution of the logging data based on the characteristic of the desired plot.

10. The computer implemented method of claim 7 further comprising:
    wherein sending the request further comprises sending the request comprising a plot limit; and
    wherein mapping the logging data further comprises mapping the logging data to a lower resolution where at least some of the logging data may be plotted outside the plot limit.

11. The computer implemented method of claim 10 further comprising sending the characteristic selected from the group consisting of a left plot limit, a right plot limit, or a plotting parameter type.

12. The computer implemented method of claim 7 further comprising, prior to the sending the reply and mapping, segmenting the logging data into at least one group, wherein the group satisfies a predetermined condition.

13. The computer implemented method of claim 12 wherein the predetermined condition comprises the ratio of a maximum logging datum to a minimum logging datum in a group.

14. The computer implemented method of claim 12 wherein the predetermined condition comprises each logging datum in the group having a plurality of most significant bits being the same.

15. The computer implemented method of claim 7 further comprising at least partially restoring the logging data to its original resolution.

16. The computer implemented method of claim 1 wherein sending a reply further comprises sending a first logging datum in substantially unreduced representation, and sending a delta value being difference between the first logging datum and the a second logging datum.

17. The computer implemented method of claim 16 further comprising sending a second delta value being the difference between the second logging datum and a third logging datum.

18. The computer implemented method of claim 16 further comprising sending a second delta value being the difference between the first logging datum and a third logging datum.

19. The computer implemented method as defined in claim 1 where sending further comprises sending the request for logging data from a log analysis application.

20. A system comprising:
a first computer that implements a repository comprising a plurality of logging data occupying a first number of bytes; and
a second computer coupled to the first computer, the second computer executes an application, the application receives the plurality of logging data, the received plurality of logging data in a reduced representation occupying a second number of bytes;
the second number of bytes is less than the first number of bytes.

21. The system as defined in claim 20 wherein the second number of bytes is less than half the first number of bytes.

22. The system of claim 20 wherein the repository of the first computer system is at least one selected from the group consisting of: a database; a data warehouse; an online analytical processing (OLAP) data store; and a flat-file.

23. The system of claim 20 wherein the application comprises a web-based log analysis application.

24. The system of claim 20 further comprising a server coupled between the first computer and the second computer, and wherein the server forwards requests to access the plurality of logging data from the application executed on the first computer to the repository implemented on the second computer.

25. The system of claim 24 wherein the server generates the reduced representation of the plurality of logging data.

26. The system of claim 20 further comprising a third computer coupled to the second computer, and wherein a user utilizes the application executed on the second computer through the third computer.

27. The system of claim 20 wherein the application receives at least some of the plurality of logging data without values indicative of depth.

28. The system of claim 27 wherein the application receives at least some of the plurality of logging data without depth information.

29. The system of claim 27 wherein the application receives at least some of the plurality of logging data without corresponding time information.

30. The system of claim 20 wherein the plurality of logging data resides in the repository with a first data resolution, and wherein the application receives at least some of the plurality of logging data mapped to a second data resolution lower than the first data resolution.

31. The system of claim 30 wherein the plurality of logging data resides in the repository as floating point numbers, and wherein the application receives plurality of logging data as integer numbers.

32. The system of claim 30 wherein the second data resolution is selected, at least in part, based on a characteristic of a desired plot.

33. The system of claim 30 wherein the application at least partially restores the logging data to the first data resolution.

34. The system of claim 20 wherein the application receives the plurality of logging data as a first logging datum in substantially unreduced representation, and a delta value being the difference between the first logging datum and a second logging datum.

35. The system of claim 34 wherein the application receives a second delta value being the difference between the second logging datum and a third logging datum.

36. The system of claim 34 wherein the application receives a second delta value being the difference between the first logging datum and a third logging datum.

37. The system as defined in claim 20 wherein the second computer executes a log analysis application.

38. A computer-readable storage media comprising an executable program that, when executed by a processor, causes the processor to:
receive a request for logging data, the request comprising a characteristic of a desired plot of the logging data; and
send, in response to the request, a reduced representation of the logging data, the amount of the reduction based at least in part on the characteristic of the desired plot.

39. The computer-readable storage media of claim 38 wherein the computer program further causes the processor to send the reduced representation of the logging data based at least in part on one or more of a left plot limit, a right plot limit, or a plotting parameter type.

40. The computer-readable storage media of claim 38 wherein the program further causes the processor to:
send at least some logging data values that do not have corresponding depth values; and
send a start depth, an end depth, and an identifier representing a number of logging data values.

41. The computer-readable storage media of claim 38 wherein the program further causes the processor to:
send at least some logging data values that do not have corresponding values time values; and
send a start time, an end time, and an identifier representing a number of logging data values.

42. The computer-readable storage media of claim 38 wherein the program further causes the processor to send logging data that is mapped to a lower resolution data format.

43. The computer-readable storage media of claim 42 wherein the program further causes the processor to send logging data that is mapped from floating point values to integer values.

44. The computer-readable storage media of claim 38 wherein the program further causes the processor to segment the logging data into a plurality of groups before the logging data is sent, and send each segment individually, the segment satisfies a predetermined condition.

45. The computer-readable storage media of claim 44 wherein the program further causes the processor to segment based at least in part on a ratio of a maximum logging datum to a minimum logging datum.

46. The computer-readable storage media of claim 44 wherein the program further causes the processor to segment based at least in part on a number of most significant bits of each logging datum in the group are the same.

47. The computer-readable storage media of claim 38 wherein the program further causes the processor to send a first datum in an uncompressed form, and send a second datum in a compressed form as a difference between the value of the first and second datum.

48. The computer-readable storage media of claim 47 wherein the program further causes the processor to send a third datum in a compressed form as a difference between the value of the second datum and the value of the third datum.

49. A computer-readable storage media comprising an executable program that, when executed by a processor, causes the processor to
send a request for logging data, the request comprising a characteristic of a desired plot of the logging data; and
receive, in response to the request, a reduced representation of the logging data, the amount of the reduction based at least in part on the characteristic of the desired plot.

50. The computer-readable storage media of claim 49 wherein the program further causes the processor to send on one or more of a left plot limit, a right plot limit, or a plotting parameter type.

51. The computer-readable storage media of claim 49 wherein the program further causes the processor to:
receive at least some logging data values that do not have corresponding depth values; and
receive a start depth, an end depth, and an identifier representing a number of logging data values.

52. The computer-readable storage media of claim 49 wherein the program further causes the processor to:
receive at least some logging data values that do not have corresponding values time values; and
receive a start time, an end time, and an identifier representing a number of logging data values.

53. The computer-readable storage media of claim 49 wherein the program further causes the processor to receive logging data that is mapped to a lower resolution data format.

54. The computer-readable storage media of claim 53 wherein the program further causes the processor to receive logging data that is mapped from floating point values to integer values.

55. The computer-readable storage media of claim 53 wherein the program further causes the processor to at least partially restore resolution of the logging data after the logging is received.

\* \* \* \* \*